(12) United States Patent
Colombie et al.

(10) Patent No.: US 7,071,270 B2
(45) Date of Patent: Jul. 4, 2006

(54) METHOD FOR OBTAINING POLYBUTADIENE-BASED AQUEOUS DISPERSIONS

(75) Inventors: Damien Colombie, Maisons Laffitte (FR); Frédéric Lemahieu, Brionne (FR); Denis Temboun N' Zudie, Vienne (FR)

(73) Assignee: Arkema, Puteaux (FR)

( * ) Notice: Subject to any disclaimer, the term of this patent is extended or adjusted under 35 U.S.C. 154(b) by 23 days.

(21) Appl. No.: 10/471,110

(22) PCT Filed: Feb. 15, 2002

(86) PCT No.: PCT/FR02/00593

§ 371 (c)(1),
(2), (4) Date: Jan. 13, 2004

(87) PCT Pub. No.: WO02/070566

PCT Pub. Date: Sep. 12, 2002

(65) Prior Publication Data

US 2004/0106727 A1    Jun. 3, 2004

(30) Foreign Application Priority Data

Mar. 8, 2001  (FR) ................... 01 03149

(51) Int. Cl.
  *C08F 4/04*   (2006.01)
  *C08F 2/22*   (2006.01)
  *C08F 236/06* (2006.01)
  *C08F 236/10* (2006.01)
  *C08F 236/12* (2006.01)

(52) U.S. Cl. ............... 526/215; 526/219; 526/219.2; 526/338; 526/340; 526/340.1; 526/341; 526/329.1

(58) Field of Classification Search ............... 526/215, 526/219, 219.2, 338, 340, 340.1, 341, 329.1
See application file for complete search history.

(56) References Cited

U.S. PATENT DOCUMENTS 3,296,226 A    1/1967   McCoy, Jr. et al.

FOREIGN PATENT DOCUMENTS

| | | |
|---|---|---|
| DE | 0 254 572 | 11/1972 |
| EP | 0 080 275 | 11/1982 |
| EP | 94739 A * | 11/1983 |
| EP | 0 230 586 | 4/1991 |
| FR | 0 013 438 | 12/1979 |
| GB | 2039497 A * | 8/1980 |

* cited by examiner

*Primary Examiner*—Kelechi C. Egwim
(74) *Attorney, Agent, or Firm*—Steven D. Boyd

(57) ABSTRACT

The invention relates to a method for preparing butadiene-based aqueous dispersions in the presence of at least one azocarboxylic acid ester.

15 Claims, No Drawings

METHOD FOR OBTAINING POLYBUTADIENE-BASED AQUEOUS DISPERSIONS

SUMMARY OF THE INVENTION

The present invention relates to a process for preparing aqueous dispersions of copolymers by emulsion polymerization of ethylenically unsaturated monomers in the presence of at least one free-radical initiator.

BACKGROUND OF THE INVENTION

Butadiene-based aqueous dispersions, especially styrene/butadiene and acrylonitrile/butadiene latices, are widely used in various applications, such as paper processing agents and in the manufacture of rubber, for example tires. It is well known that the emulsion polymerization of butadiene or its copolymerization with other monomers produces a crosslinked polymer whose degree of branching increases as the degree of conversion increases. This crosslinking has a harmful effect on the working properties of the latices obtained. For example, it may have an effect on the coalescence of the latex particles during coating applications, for instance paper coating, or may contribute towards poor control of the hardness of rubber, thus limiting its processability.

To limit the degree of crosslinking and/or the molecular mass of the copolymer formed, it is possible either to work at limited conversion or to use a chain-transfer agent during the polymerization. The transfer agents commonly used are mercaptans, which, although having a very low residual content in the final latices, they induce an undesirable characteristic odor.

The aim of the present invention is to overcome the drawbacks of the prior art by proposing an efficient polymerization process, resulting in a good conversion of the monomers, which gives copolymer latices with a low degree of crosslinking. This low crosslinking may be exploited to reduce the mercaptan content and thus to reduce the odor or to increase the degree of conversion without obtaining prohibitive degrees of crosslinking.

According to the present invention, the process for obtaining aqueous dispersions of copolymers, which consists in polymerizing a blend of monomers containing at least 60% by weight of butadiene and at least one monomer chosen from styrene, acrylic esters, vinyl nitriles with optionally up to 40% by weight of one or more other copolymerizable unsaturated monomers, as an aqueous emulsion in the presence of one or more free-radical initiator(s), is characterized in that at least one of the initiators or the initiator is an azocarboxylic acid ester of formula (I):

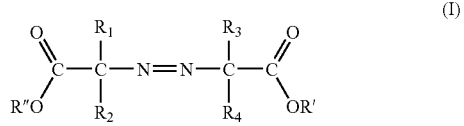

(I)

in which:

$R_1$, $R_2$, $R_3$ and $R_4$, which may be identical or different, are independently selected from the group consisting of
linear or branched alkyls containing from 1 to 9 carbon atoms and preferably from 1 to 4 carbon atoms, optionally substituted with one or more substituents selected from hydroxyl, $C_1$ to $C_6$ alkoxy and halogen substituents;

$C_3$ to $C_{12}$ cycloalkyls, optionally substituted with one or more substituents selected from $C_1$ to $C_6$ alkyl, $C_1$ to $C_6$ alkoxy, hydroxyl and halogenated groups;

aralkyls optionally substituted with one or more $C_1$ to $C_6$ alkyl, $C_1$ to $C_6$ alkoxy, hydroxyl and halogenated groups;

aryls optionally substituted with one or more substituents selected from $C_1$ to $C_6$ alkyl, $C_1$ to $C_6$ alkoxy, hydroxyl and halogenated groups;

with at least one of the combinations $R_1$–$R_2$ and $R_3$—$R_4$ possibly forming an aliphatic ring; R" and R' are identical or different and are independently selected from the group consisting of linear or branched $C_1$ to $C_{10}$ and preferably $C_1$ to $C_4$ aliphatic radicals.

DETAILED DESCRIPTION OF THE INVENTION

The advantage of these azocarboxylic acid esters is their low melting point, generally less than 27° C. The preferred azocarboxylic acid esters are those in which R" and R' represent methyl or ethyl and in which $R_1$, $R_2$, $R_3$ and $R_4$ advantageously represent $C_1$ to $C_4$ alkyl groups. Furthermore, they do not generate toxic products or even cyano compounds.

The azocarboxylic acid ester that is particularly preferred is 2,2'-diethyl azobisisobutyrate, i.e. with $R_1$, $R_2$, $R_3$ and $R_4$ representing methyl and R' and R" representing ethyl. A mixture of 2,2'-diethyl azobisisobutyrate (DEAB) and of 2,2'-dimethyl azobisisobutyrate (DMAB) with a mass proportion of DEAB preferably of greater than 50% has given very advantageous results. Mixtures of DEAB, DMAB and 2-methyl 2'-ethyl azobisisobutyrate preferably with a COOMe/COOEt molar ratio ≦10 also be used.

The azocarboxylic acid esters of formula (I) may be prepared via a standard two-step process comprising a first step of converting azonitrile, by reaction with an alcohol, in the presence of HCl, according to the Pinner reaction, giving the corresponding azoimino ether hydrochloride, and a second step of hydrolysis in the presence of the hydrochloride thus obtained. They may also be prepared via improved processes as described in documents DE 2 254 572, EP 80 275 and EP 230 586.

In addition, these esters may be prepared by reacting an azonitrile with an alcohol and hydrochloric acid in an aromatic solvent, with an HCl/azonitrile molar ratio >2 when the alcohol is methanol and >3 when the alcohol is ethanol or a higher alcohol.

Advantageously, the azocarboxylic acid ester is used in combination with other initiators commonly used in emulsion polymerization, such as hydroperoxides, especially tert-butyl hydroperoxide or diisopropylbenzene, and sodium, potassium or ammonium persulfate.

The amount of azocarboxylic acid ester is preferably between 5% and 95% by weight and more preferably between 30% and 70% by weight relative to the total weight of the initiators.

The total amount of initiators used is between 0.05% and 4% by weight relative to the weight of monomers used.

The initiators may be introduced batchwise, continuously, semi-batchwise or semi-continuously.

These initiators may be combined with a reducing agent, for instance bisulfite or metabisulfite.

The term "acrylic esters" denotes esters of acrylic acid and of methacrylic acid with $C_1$–$C_{12}$ and preferably $C_1$–$C_8$ alkanols, such as methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate. The vinyl nitriles include those containing from 3 to 12 carbon atoms, in particular acrylonitrile and methacrylonitrile.

The styrene may be totally or partially replaced with α-methylstyrene or vinyltoluene.

The ethylenically unsaturated monomers that are polymerizable with the above monomers, and may be incorporated at up to 40% by weight of the total weight of the monomers, mention may be made of:

- vinyl esters of carboxylic acids, for instance vinyl acetate, vinyl versatate or vinyl propionate;
- ethylenic unsaturated monocarboxylic and dicarboxylic acids, for instance acrylic acid, methacrylic acid, itaconic acid, maleic acid, fumaric acid and monoalkyl esters of dicarboxylic acids of the type mentioned with alkanols preferably containing 1 to 4 carbon atoms, and the N-substituted derivatives thereof;
- unsaturated carboxylic acids or amides, for instance acrylamide, methacrylamide, N-methylolacrylamide or N-methylolmethacrylamide;
- ethylenic monomers comprising a sulfonic acid group and the alkali metal or ammonium salts thereof, for example vinylsulfonic acid, vinylbenzenesulfonic acid, α-acrylamidomethylpropanesulfonic acid or 2-sulfoethylene methacrylate;
- unsaturated ethylenic monomers comprising a secondary, tertiary or quaternary amino group or a heterocyclic group containing nitrogen, for example vinylpyridines, vinylimidazoles, aminoalkyl (meth)acrylates and aminoalkyl (meth)acrylamides, for instance dimethylaminoethyl acrylate or methacrylate, di-tert-butylaminoethyl acrylate or methacrylate, dimethylaminoethylacrylamide or dimethylaminoethylmethacrylamide, and zwitterionic monomers, for instance sulfopropyl(dimethyl)aminopropyl acrylate;
- esters of (meth)acrylic acids with alkanediols preferably containing 2–8 carbon atoms, such as glycol mono(meth)acrylate, hydroxypropyl mono(meth)acrylate and 1,4-butanediol mono(meth)acrylate, and also monomers comprising two polymerizable double bonds, for instance ethylene glycol dimethacrylate.

In addition to the monomers mentioned, it is also possible to use, in smaller amounts generally of between 0.1% and 5%, unsaturated ethylenic monomers with a crosslinkable nature, such as glycidyl (meth)acrylate or vinyl and acrylic silanes.

Although it is not necessary, the polymerization may be performed in the presence of a transfer agent such as mercaptans, especially t-dodecyl mercaptan and substituted diphenyl disulfides, especially bis(methoxyphenyl) disulfide. The amount of transfer agent used is preferably between 0.05% and 5% by weight relative to the weight of the monomers.

The polymerization temperature, which depends on the initiator used, is generally between 40° C. and 100° C. and preferably between 50° C. and 90° C. The stabilization of the particles is provided, if necessary, by any known colloidal stabilization system, for instance anionic, cationic, amphoteric and nonionic emulsifiers.

The anionic emulsifiers are, for example, alkyl sulfates, alkyl sulfonates, alkyl aryl sulfonates and alkaline alkyl phosphates; dialkyl sulfosuccinates; the sodium, potassium or ammonium salts of saturated or unsaturated fatty acids. Examples of cationic emulsifiers are alkylpyridinium or alkylammonium salts, for instance N-ethyldodecylammonium chloride or bromide, and cetylammonium chloride or bromide. Preferred nonionic emulsifiers include polyoxyethylenated and/or polyoxypropylenated derivatives of fatty alcohols, of fatty acids or of alkylphenols.

The polymerization may be performed continuously, batchwise or semi-batchwise with introduction of a portion of the monomers continuously, and may be of the "seeded" or "incremental" type according to any variant known for obtaining particles of homogeneous and heterogeneous structure.

The process according to the present invention makes it possible, for an identical degree of crosslinking, to work in the absence of a transfer agent or in the presence of a reduced amount of transfer agent or to continue the polymerization to a higher conversion than in the processes of the prior art.

The aqueous dispersions thus obtained may advantageously be used as binders in coating compositions for coating paper, in the textile industry, in particular for manufacturing nonwovens, and as an additive in paints and adhesive formulations.

EXAMPLES

In the text hereinbelow, except where otherwise mentioned, the reagents are given in parts by weight and DEAB means 2,2'-diethyl azobisisobutyrate AZOCARBOXY means 2,2'-azobiscyanopentanoic acid TDM means t-dodecyl mercaptan KPS means potassium persulfate NaPS means sodium persulfate Preparation of the Seeds The following are charged into a 3 liter reactor:

|  | Parts |
|---|---|
| Water | 96 |
| NaPS | 0.45 |
| Sodium methallyl sulfonate | 1 |
| Sodium pyrophosphate | 1 |
| Sodium dodecyl sulfate | 1 |

The mixture is heated to 75° C., followed by rapid introduction of:

|  | Parts |
|---|---|
| Styrene | 5 |
| Butyl acrylate | 4.8 |
| Acrylic acid | 0.2 |

5 minutes after introducing the monomers, exothermicity is observed to 82° C., and the polymerization is then allowed to continue at 82° C. for 1 hour.

The uncured seed thus obtained has a solids content of 11.6% by weight and the mean particle diameter is 58.3 mm.

The process is performed as described previously except that, after one hour at 82° C., the mixture is maintained at 90° C. for 14 hours in order to remove the excess NaPS. A cured seed with a solids content of 13.4% by weight and a mean particle diameter of 58.7 mm is obtained.

General Procedure for Preparing the Latices

The seed prepared above is placed in a three liter reactor, to which is added the initiator, the reaction medium is then brought to a temperature of 30° C. and a pressure of 12 bar, and the pressure is allowed to stabilize in order to check that there are no leaks that may cause a loss of pressure. The reactor is returned to atmospheric pressure over 15 minutes and the temperature is raised to 75° C. A vacuum of −1 bar is created in the headspace of the reactor for 3 minutes, followed by addition of the styrene/butadiene/acrylic acid/TDM mixture contained in the feed, over 5 hours. The polymerization is then allowed to continue for 20 hours, followed by cooling to 30° C. and degassing for 30 seconds at atmospheric pressure. The latex is recovered and analyzed in terms of solids content, insolubles content, swelling index and particle size.

Determination of the Swelling Index and the Percentage of Insolubles in the Latices An amount of latex is placed in a Teflon container in order to obtain a dry film 2 mm thick, which will be dried for 24 hours at least at room temperature and then in an oven between 50 and 60° C. for 24 to 48 hours, until the film can be detached from the Teflon container.

Two specimens 10×25 mm are cut out of this film using a punch, such that P0 is the weight of the specimen. The specimen is introduced into a 60 ml flask containing 50 g of THF solvent, to immerse it completely.

The results obtained with tests 1 to 8 are given in Table I.

The flask containing the specimen and the solvent is placed on a roll agitator also provided with a tipping motion (agitation speed of the rollers ~50 rpm).

After immersion for 24 hours, the specimen is removed from the flask and dried superficially on a filter and weighed as quickly as possible, such that P1 is the specimen swollen with solvent.

This specimen is placed in a pre-prepared crystallizing dish with the filter and is then dried for 24 hours at 60° C.

The assembly is then weighed. The tare of the crystallizing dish and of the filter is subtracted from the weight of the assembly to obtain P2, the weight of the specimen.

Expressing the Results $$\text{swelling index} = \frac{\text{weight of the swollen specimen}}{\text{weight of the redried specimen}} = \frac{P1}{P2}$$

$$\% \text{ of insolubles} = \frac{\text{weight of the redried specimen}}{\text{initial weight of the specimen}} \times 100 = \frac{P2}{P0}$$

An increase in the degree of crosslinking has the consequence of increasing the insolubles content and reducing the degree of swelling.

The solids content is determined according to a gravimetric method which consists in drying 1 gram of latex in an oven for one hour.

The particle size is measured by light scattering using a Coulter LS 230 machine.

TABLE I

| Test | 1 | 2 | 3 | 4 | 5 | 6 | 7 | 8 |
|---|---|---|---|---|---|---|---|---|
| Uncured seed (g) | 460 | 460 | — | — | — | — | — | — |
| Cured seed (g) | — | — | 460 | 460 | 460 | 460 | 460 | 460 |
| NaPS (g) | 0.4 | — | 1.16 | 2.7 | 0.27 | 1.16 | 1.16 | 2.7 |
| DEAB (g) | — | 0.43 | 0.63 | — | 1.31 | 0.63 | — | — |
| AZOCARBOXY (g) | — | — | — | — | — | — | 0.68 | — |
| Styrene (g) | 240 | 240 | 222.8 | 222.8 | 222.8 | 222.8 | 222.8 | 222.8 |
| Butadiene (g) | 148 | 148 | 137.4 | 137.4 | 137.4 | 137.4 | 137.4 | 137.4 |
| Acrylic acid (g) | 8 | 8 | 7.4 | 7.4 | 7.4 | 7.4 | 7.4 | 7.4 |
| TDM (g) | 2 | 2 | 3.7 | 3.7 | 3.7 | 2.78 | 3.7 | 2.78 |
| 5 hours after casting solids content % | 33.93 | 30.49 | — | 38.62 | 23.36 | — | 23.58 | — |
| Size nm | 79.7 | 119 | — | 114 | 111 | — | — | — |
| Solids content % final | 47.63 | 47.4 | 45.55 | 48.04 | 34.15 | 47.32 | 45.9 | 47.02 |
| Size nm | 105 | 129 | 130 | 110 | 125 | 138 | 116 | 132 |
| Attachment (g) | 35 | 33.6 | 0.5 | 0.5 | 150 | 1 | 37 | 25 |
| Swelling index | 12.75 | 14.11 | 26.47 | 25.08 | 37.61 | 25.02 | 30.91 | 15.02 |
| % insolubles | 74.69 | 68.9 | 56.22 | 62.4 | 52.94 | 67.31 | 57.48 | 72.75 |

The invention claimed is:

1. A process for obtaining an aqueous dispersion of copolymers comprising polymerizing a blend of monomers comprising butadiene and at least one monomer selected from the group consisting of styrene, acrylic esters and vinyl nitriles, as an aqueous emulsion in the presence of one or more free-radical initiator(s), wherein said initiator(s) comprise an azocarboxylic acid ester of formula (I):

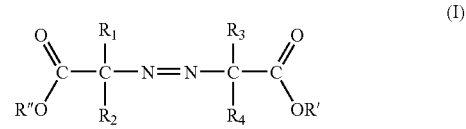

wherein:

$R_1$, $R_2$, $R_3$ and $R_4$, which may be identical or different, are independently selected from the group consisting of:

linear or branched alkyls containing from 1 to 9 carbon atoms and preferably from 1 to 4 carbon atoms, optionally substituted with one or more substituents selected from hydroxyl, $C_1$ to $C_6$ alkoxy and halogen substituents;

$C_3$ to $C_{12}$ cycloalkyls, optionally substituted with one or more substituents selected from $C_1$ to $C_6$ alkyl, $C_1$ to $C_6$ alkoxy, hydroxyl and halogenated groups;

aralkyls optionally substituted with one or more $C_1$ to $C_6$ alkyl, $C_1$ to $C_6$ alkoxy, hydroxyl and halogenated groups;

aryls optionally substituted with one or more substituents selected from $C_1$ to $C_6$ alkyl, $C_1$ to $C_6$ alkoxy, hydroxyl and halogenated groups, wherein one or more of the combinations $R_1$–$R_2$ and $R_3$–$R_4$ optionally forms an aliphatic ring;

and wherein R" and R' are identical or different and are independently selected from the group consisting of unsubstituted linear or branched $C_1$ to $C_{10}$ aliphatic radicals.

2. The process as claimed in claim 1 wherein said blend of monomers further comprises up to 40% by weight of one or more other copolymerizable unsaturated monomers.

3. The process as claimed in claim 1, characterized in that the initiator comprises 2,2'-diethyl azobisisobutyrate, or a mixture of 2,2'-diethyl azobisisobutyrate (DEAB) and 2,2'-dimethyl azobisisobutyrate (DMAB).

4. The process as claimed in claim 1 wherein the mass proportion of DEAB to DEAB is greater than 50%.

5. The process as claimed in claim 3, characterized in that the initiator comprises a mixture of 2,2'-diethyl azobisisobutyrate, 2,2'-dimethyl azobisisobutyrate and 2-methyl 2'-ethyl azobisisobutyrate.

6. The process as claimed in claim 5 wherein the molar ratio of COOMe/COOEt is less than or equal to 10.

7. The process as claimed in claim 1, characterized in that the free radical initiator(s) comprise said azocarboxylic acid ester in combination with other emulsion polymerization initiators.

8. The process as claimed in claim 7 wherein said other emulsion polymerization initiators comprise persulfates, hydroperoxides, or a mixture thereof.

9. The process as claimed in claim 8, characterized in that the amount of azocarboxylic acid ester is between 5% and 95% by weight relative to the total weight of the initiators.

10. The process of claim 9 characterized in that the amount of azocarboxylic acid ester is between 30% and 70% by weight relative to the total weight of the initiators.

11. The process as claimed in claim 1, characterized in that the total amount of initiators is between 0.05% and 4% by weight relative to the weight of monomers.

12. The process as claimed in claim 1, characterized in that the polymerization is performed in the presence of a transfer agent.

13. The process as claimed in claim 1 wherein said R" and R' are identical or different and are independently selected from the group consisting of linear or branched $C_1$ to $C_4$ aliphatic radicals.

14. The process as claimed in claim 1, characterized in that the polymerization temperature is between 40 and 100° C.

15. The process as claimed in claim 13, characterized in that the polymerization temperature is between 50 and 90° C.

* * * * *